(12) United States Patent
Clark et al.

(10) Patent No.: US 6,704,733 B2
(45) Date of Patent: Mar. 9, 2004

(54) DISTRIBUTING ELECTRONIC BOOKS OVER A COMPUTER NETWORK

(75) Inventors: George Philip Clark, Lutz, FL (US); Jeffrey Walter Crawford, Penfield, NY (US); Edward John Marino, Nashville, TN (US); Laurance Holmes Brewster, Brentwood, TN (US)

(73) Assignee: Lightning Source, Inc., LaVergne, TN (US)

( * ) Notice: Subject to any disclaimer, the term of this patent is extended or adjusted under 35 U.S.C. 154(b) by 253 days.

(21) Appl. No.: 09/963,928

(22) Filed: Sep. 26, 2001

(65) Prior Publication Data

US 2002/0152215 A1 Oct. 17, 2002

Related U.S. Application Data

(60) Provisional application No. 60/243,259, filed on Oct. 25, 2000.

(51) Int. Cl.$^7$ .............................................. G06F 17/30
(52) U.S. Cl. .................. 707/10; 707/104; 715/526; 715/530; 709/218; 709/219; 705/26; 705/27
(58) Field of Search .............................. 707/104, 102, 707/103, 10; 715/526, 530; 705/26, 27, 17, 18, 1; 709/217, 218, 219

(56) References Cited

U.S. PATENT DOCUMENTS

| | | | | |
|---|---|---|---|---|
| 5,339,091 A | * | 8/1994 | Yamazaki et al. | .......... 345/104 |
| 5,383,554 A | * | 1/1995 | Cowan | .......... 206/310 |
| 5,465,213 A | * | 11/1995 | Ross | .......... 700/117 |
| 5,532,920 A | | 7/1996 | Hatrick et al. | |
| 5,734,823 A | | 3/1998 | Saigh et al. | |
| 5,734,891 A | * | 3/1998 | Saigh | .......... 707/10 |
| 5,864,823 A | | 1/1999 | Levitan | |
| 5,907,845 A | | 5/1999 | Cox et al. | |
| 6,012,890 A | | 1/2000 | Celorio Garrido | |
| 6,119,109 A | | 9/2000 | Muratani et al. | |
| 6,125,352 A | | 9/2000 | Franklin et al. | |
| 6,154,214 A | | 11/2000 | Uyehara et al. | |
| 6,493,734 B1 | * | 12/2002 | Sachs et al. | .......... 715/526 |

FOREIGN PATENT DOCUMENTS

JP    61 (1986) 97795 12    5/1986

OTHER PUBLICATIONS

Oliver et al., "Building an electronic Book on the internet : CESP– an interdisciplinary Syllabus for teachings computational Science at the graduate level.", IEEE, pp. 430–433, 1994.*

(List continued on next page.)

*Primary Examiner*—Jean M. Corrielus
(74) *Attorney, Agent, or Firm*—Kevin A. Oliver; Foley Hoag LLP

(57) ABSTRACT

In general, in one aspect, the disclosure describes a method of processing content for distribution over a computer network. The method includes receiving submitted electronic content, accessing identification of at least one of a set of more than one electronic book digital rights management (DRM) systems, and automatically generating an electronic book from the received electronic content for distribution in accordance with the identified electronic book digital rights management system(s).

1 Claim, 18 Drawing Sheets

OTHER PUBLICATIONS

Ray E. Desrosier, "Electronic as teaching supplements", IEEE, pp. 1419–1421, FIE'96.*

Bernard Conan Pobiak "Adjustable Access Electronic books", IEEE, pp.90–94, 1992.*

Ozsoyoglu et al., "Electronic books in digital libraries", IEEE, pp. 1–10, 2000.*

James M. Bryant, "The Electronic book– a user wishlist", IEEE, pp. 9/1–9/3.*

H. Landis Floyd II et al., "An overview of the IEEE color books", IEEE, pp. 3226–3231, 2000.*

Bervely L. Harrison, "E–book and the future of reading", IEEE, pp. 32–39, May/Jun. 2000.*

Desmoulins et al., "Pattern based annotations on e–books: From personal to shared didactic content", IEEE, pp. 1–4, 2002.*

L. Robert et al., "Image and Text coupling for creating electronic books from manuscripts", IEEE, pp. 823–826, 1997.*

Watanabe et al., "Visual interface for retrieval of electronic–formed books", IEEE, pp. 692–695, 1993.*

James M. Bryant., The paperless book, IEEE, pp.245–247, 1995.*

C. Edward Oliver et al., "Teaching Interdisciplinary computational Science from an electronic book on the Internet", IEEE, pp. 347–350, 1994.*

Aedo et al., "Assessing the utility of an interactive electronic book for learning the PASCAL programming language", IEEE, vol. 43, No. 3, Aug. 2000.*

PCT International Search Report from International Application No. PCT/US01/30446.

PCT International Search Report from International Application No. PCT/US01/30601.

* cited by examiner

FIG. 6

| Market | * Print & Distribute Rights | * List Price | | * Wholesale Discount |
|---|---|---|---|---|
| US | ☑ | 35 | USD | 50 % |
| UK | ☑ | 70 | GBP | 50 % |

Special Instructions:
Enter the special instructions for this title here.

Print-On-Demand Information:

* ISBN: 0679454799

* Binding: 6 x 9 in or 229 x 152 mm Blue Cloth w/Jacket

* Returnable? Yes

* Ingram Advance Catalog? Yes(Fee)

* Would you like to order a proof? Yes(Fee) ~288

Market Pricing:

Cloth Spine Text: Into the West ~290

FIG. 9

DISTRIBUTING ELECTRONIC BOOKS OVER A COMPUTER NETWORK

REFERENCE TO RELATED APPLICATIONS

This application claims priority from co-pending U.S. provisional application Serial No. 60/243,259, filed Oct. 25, 2000, entitled "Systems and Methods for Digital Content Submission, Management and Distribution", which is incorporated by reference in its entirety herein.

This application relates to U.S. patent application Ser. No. 09/906,428, entitled "Processing Content For Electronic Distribution using a Digital Rights Management System", filed on Jul. 16, 2001; U.S. patent application Ser. No. 09/906,443, entitled "Electronic Content Distribution", filed on Jul. 16, 2001; and U.S. patent application Ser. No. 09/906,203, entitled "Fulfilling a Request for an Electronic Book", field on Jul. 16, 2001.

BACKGROUND

Much like an ordinary printed book, electronic books ("eBooks") can be used to present text and pictures to readers. Instead of ink and paper, however, an electronic book is a collection of digital data that software, known as an electronic book reader, can interpret and present on a display. A variety of devices run electronic book reader software such as personal computers, handheld personal digital assistants (PDAs), cellular phones with displays, and so forth.

Electronic books can offer a variety of features not traditionally associated with print books. For example, instead of text and pictures, an electronic book may also store data used to present sound such as music and speech. Further, instead of still pictures, an electronic book can also present animated images. Additionally, by transmitting eBook data over a computer network, eBooks can be delivered to remote locations almost instantaneously.

Unfortunately, in many ways, copying data is easier than photocopying pages of a book. To protect the rights of those trying to sell or otherwise limit access to electronic books from pirating, companies have developed a wide variety of digital rights management (DRM) systems. For example, Microsoft currently offers a "Digital Asset Server" that guards against unauthorized user access to Microsoft Reader eBooks. Similarly, Adobe offers a number of different DRM solutions such as Adobe Content Server.

DRM solutions differ significantly in their approaches to the task of controlling access to eBooks. For the purposes of illustration, however, FIGS. 1 and 2 depict a typical DRM scheme. As shown in FIG. 1, a client 104, such as a PDA or personal computer, can send a message 108 to a server 100 over a network 102 such as the Internet. The message 108 requests access to an eBook and includes credentials of the requester such as the identity of the device 104 and/or reader software making the request. The server 100 uses the credentials to scramble (i.e., encrypt) the data of the requested eBook. As shown in FIG. 2, the server 100 then sends the scrambled data 106 to the requesting client 104. Using its own credentials, the client 104 reader can unscramble (i.e., decrypt) and present the eBook to a user. If a device other than the client 104 receives the eBook data, it should lack the proper credentials needed to perform the unscrambling.

SUMMARY

In general, in one aspect, the disclosure describes a method of distributing electronic books over a computer network. The method includes transmitting user interface instructions to a publisher's network client in response to an HTTP (HyperText Transfer Protocol) request received from the client. The user interface instructions provide a web-page form that enables the publisher to identify electronic content and corresponding metadata. The metadata includes designation of at least one electronic book digital rights management system from at least two supported digital rights management schemes from different unaffiliated vendors. The metadata also including hard printing information.

After receiving the identified electronic content and metadata from the network client, the method includes automatically generating an electronic book from the received electronic content corresponding to the identified electronic book digital rights management system. The method also includes storing the metadata with metadata associated with other received electronic content, selecting metadata from the stored metadata that corresponds to electronic content authorized for a retailer, and storing at least a portion of the selected metadata for transmission to the retailer over the network in accordance with formatting information received from the retailer. The method further includes receiving a request for the electronic book from a network client in response to a user's selection of the corresponding electronic content from a user interface provided by the retailer, determining whether to distribute the electronic book to the network client by applying one or more business rules to the request, and distributing the electronic book to the network client in accordance with the electronic book's electronic book digital rights management system.

BRIEF DESCRIPTION OF THE DRAWINGS

FIGS. 5–11 are screenshots of a user interface presented to a publisher.

DETAILED DESCRIPTION

I. Introduction

Figures 1, 2:
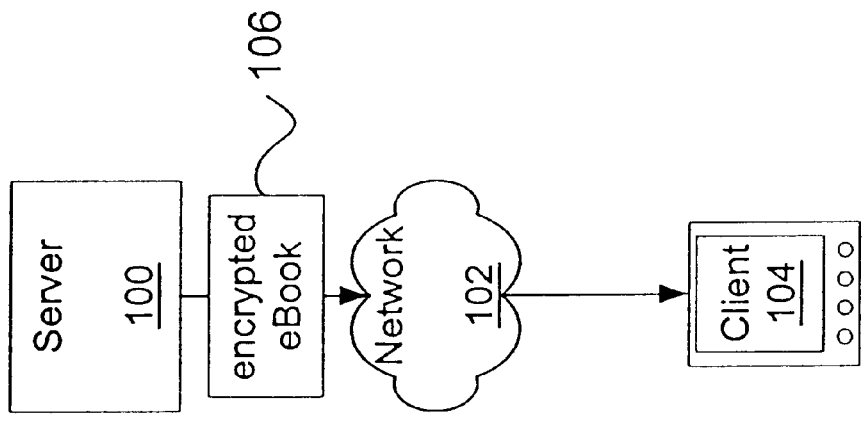
FIGS. 1–2 are diagrams illustrating an example of an electronic book digital rights management system.
Figure 3:
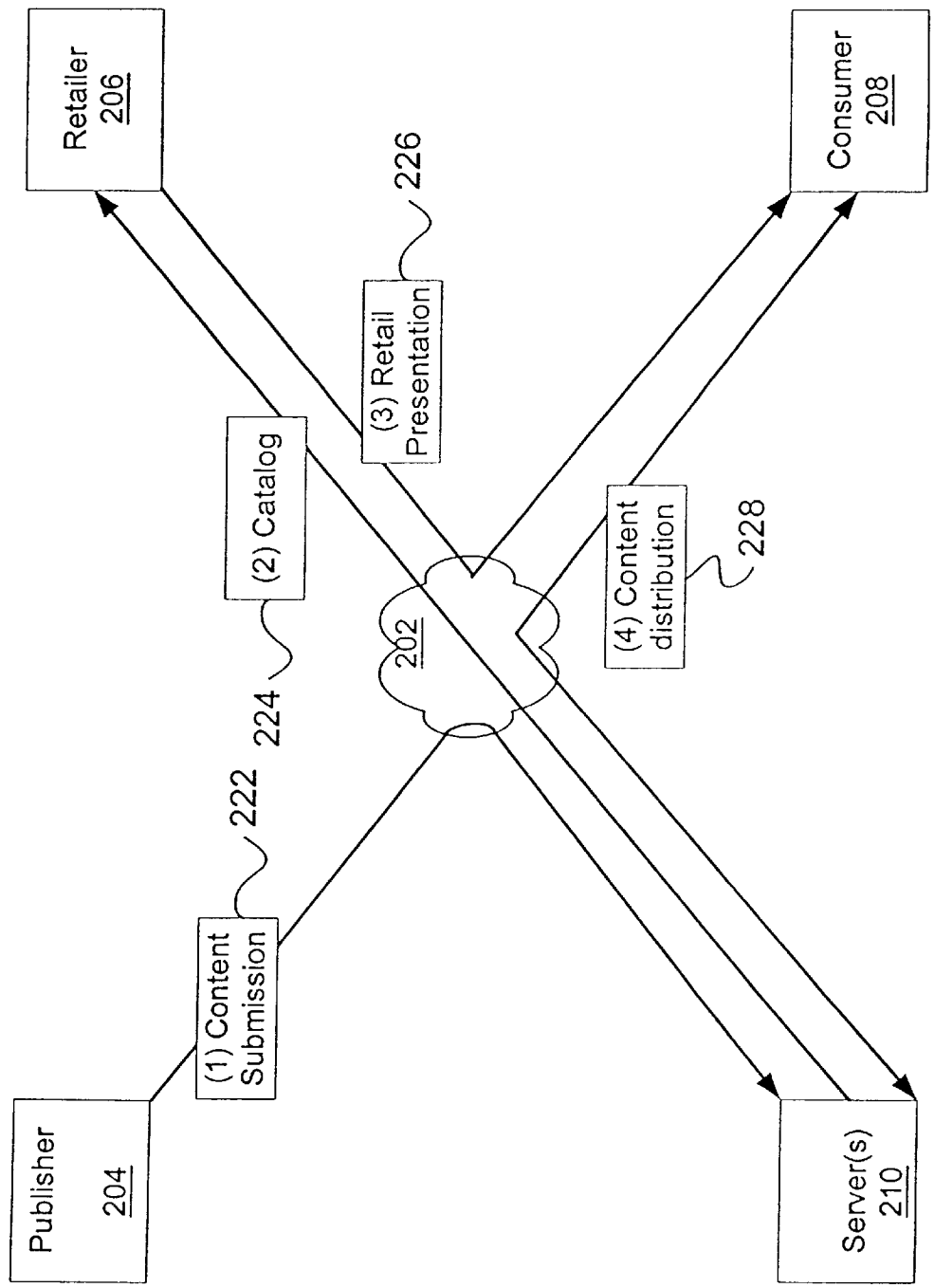
FIG. 3 is a diagram illustrating different features a server can provide to publishers, retailers, and consumers.

FIG. 3 shows a server 210 that can provide a variety of features that can ease tasks involved in electronic and printed book distribution. To illustrate some of these features, FIG. 3 shows a sample sequence that begins with submission 222 of a title from a publisher 204 and ends with the title's distribution 228 to a consumer 208.

As shown in FIG. 3, a publisher client 204 can submit content 222 for a title to the server 210 over a network 202 such as the Internet. Such content can include data specifying text, graphics, and even multimedia such as music or video.

The publisher client 204 can also submit information about the content known as "metadata". The metadata can include identifier information such as the ISBN, UPC or DOI of the work; pricing information for one or more markets in which the work may be sold; bibliographic information such as the author and title of the work; distribution information such as identification of territories where selling the work is authorized, retailers authorized to sell the work, and/or identification of one or more digital rights management systems for protecting the work when distributed electronically; and/or manufacturing information, such as a printing and/or binding specifications, for use in the preparation of hard copies of the work.

The server 210 can automatically prepare the content for distribution. For example, for electronic distribution, the server 210 can automatically format eBook information for distribution of the title in accordance with one or more selected digital rights management systems. For hard copy manufacturing and distribution, the server 210 can automatically prepare the content for printing, for example, by extracting a cover page for color printing and generating bit-map images of book pages.

In addition to the behind-the-scenes work of preparing content for distribution, the server 210 may also provide information to retailers 206, such as Amazon.com and BarnesandNoble.com, to help display and sell titles. For example, the server 210 may use collected metadata to generate a customized catalog file 224 of content authorized for sale by a retailer 206. The catalog file 224 can include author names, a summary, and/or selected images (e.g., book cover thumbnails). A retailer 206 can use the catalog file 224 to automatically update its web-site's offerings. For example, Amazon.com can automatically generate web-pages for newly available titles identified in the catalog file 224.

The server 210 can also insulate retailer 206 from the technical details of title distribution across multiple digital rights management systems. For example, after a consumer 208 selects an eBook from the retailer's 206 web-site 226, the server 210 can distribute 228 the title to a consumer 208 in accordance with a digital rights management system selected for the content. This frees the retailer 206 from the burden of setting-up, integrating, and maintaining a host of different digital rights management systems that different eBook formats may require. Similarly, for a hard copy, the server 210 can offer a "print-on-demand" service that produces a hard copy of a title for delivery to a consumer or retailer.

Though FIG. 3 depicts a single publisher 204, retailer 206, and consumer 208, the server 210 can support a very large number of each of these entities. Further, while the server 210 may constitute a single computer, the server 210 may instead represent a logical collection of devices.

While the description above highlights a few features offered by the server 210, the server 210 can also offer a wide array of other services such as providing reports (e.g. usage reports, title demand reports, retailer invoices, and publisher compensation) to retailers 206 and publishers 204. A server 210 may offer all of the features described above or only support a limited subset of these services. These and other features are described in greater detail below.

II. Content Submission

Figure 4:
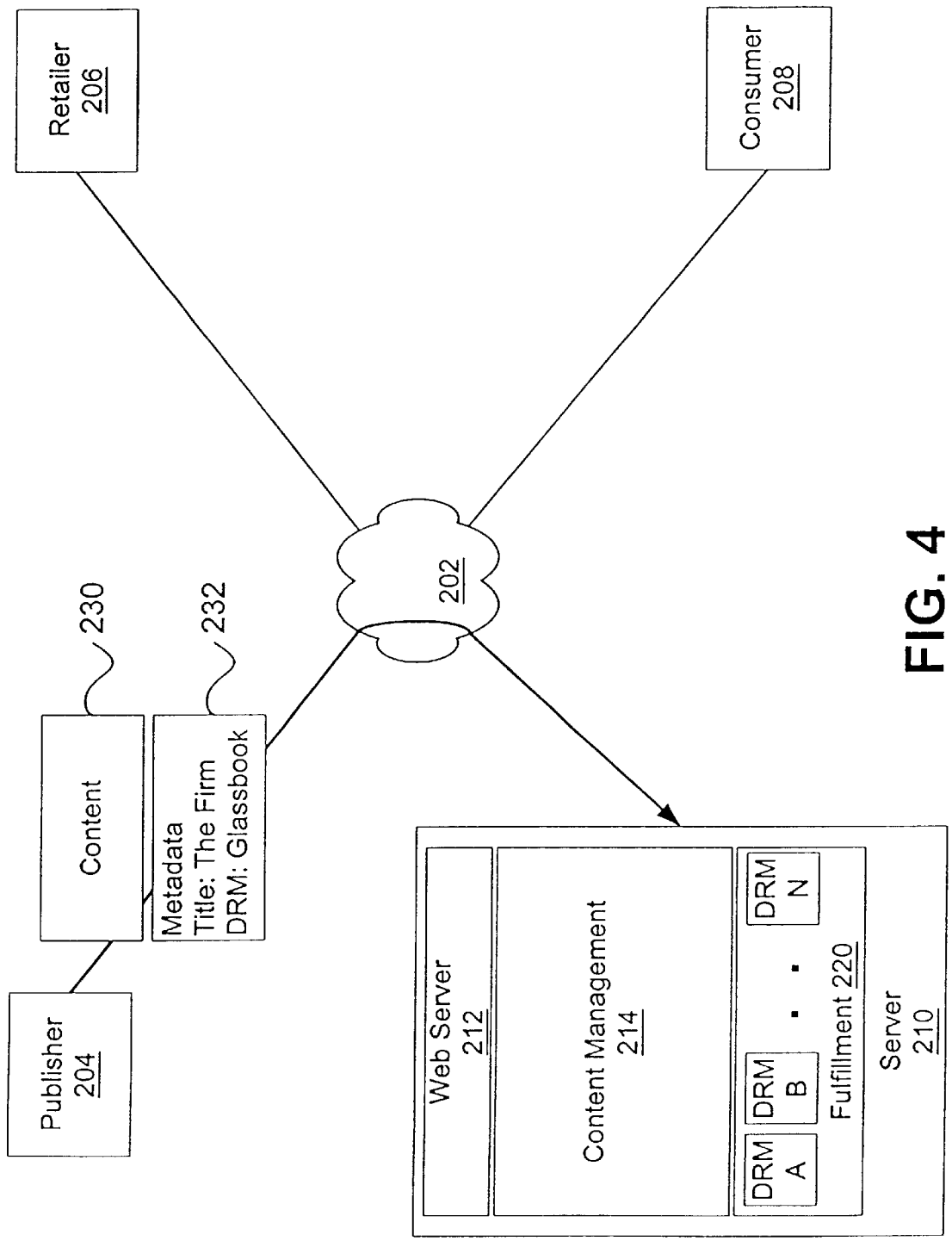
FIG. 4 is a diagram illustrating content submission over a network.

FIG. 4 illustrates a scheme that enables a publisher 204 to securely transmit content 230 over a network 202 to a server 210 for subsequent electronic distribution and/or hard copy printing. As shown, in addition to content 230, the server 210 can also receive metadata 232 corresponding to the content. Such metadata can include bibliographic information about the content, "print-on-demand" information used to generate a hard copy of the content, and/or distribution information such as identification of retailers authorized to sell the content and/or identification of one or more electronic book digital rights management (DRM) systems. For security, the server 210 and publisher client 204 can communicate over a secure network connection, such as HTTPS (HyperText Transfer Protocol Secure), that encrypts/decrypts information communicated by the publisher client 204 and the server 210.

The server 210 can use the received content 230 and metadata 232 to automatically generate distribution versions of the content. For example, for electronic distribution, the server 210 can automatically prepare a version of the content for distribution in accordance with the identified DRM scheme(s). Similarly, for hard copy printing, the server 210 can automatically generate a version of the content, for example, by preparing an image of each page to be printed.

As shown in FIG. 4, the server 210 includes a content management 214 system that stores and processes the received content 230 and metadata 232. The server 210 also includes a fulfillment system 220 that features instructions for different digital rights management systems. For example, the fulfillment system 220 may support DRMs from non-affiliated vendors. For instance, the system 220 may feature Microsoft Reader Digital Asset Server and Adobe Content Server Digital Rights Management System.

As shown, the server 210 may also include web server instructions 212 that make these features available to a publisher 204 via an Internet web-site. In technical terms, the web server instructions 212 handle HTTP (HyperText Transfer Protocol) messages exchanged with network clients (e.g., web browsers). These messages can include, for example, instructions for presenting a user interface that transmits information collected from a remote user back to the server 210. Such user interface instructions may be encoded in a variety of ways such as SGML (Structured Generalized Markup Language) instructions (e.g., HTML (HyperText Markup Language) and XML (extensible Markup Language)) or instructions that include conditional statements (e.g., "IF" statements) such as an applet.

FIGS. 5–11 illustrate samples of user interface screens the server 210 may provide to a publisher to collect content and metadata. These sample screens depict stages of a sample process of content submission that includes selecting one or more distribution options, providing information for the selected options, monitoring the processing status of submitted content, and proofing a distribution version of the content. The following sequence may be preceded, for example, by user interface screens that enable a publisher to set up an account. For instance, a publisher may provide banking or credit information for billing and/or compensation.

Figure 5:
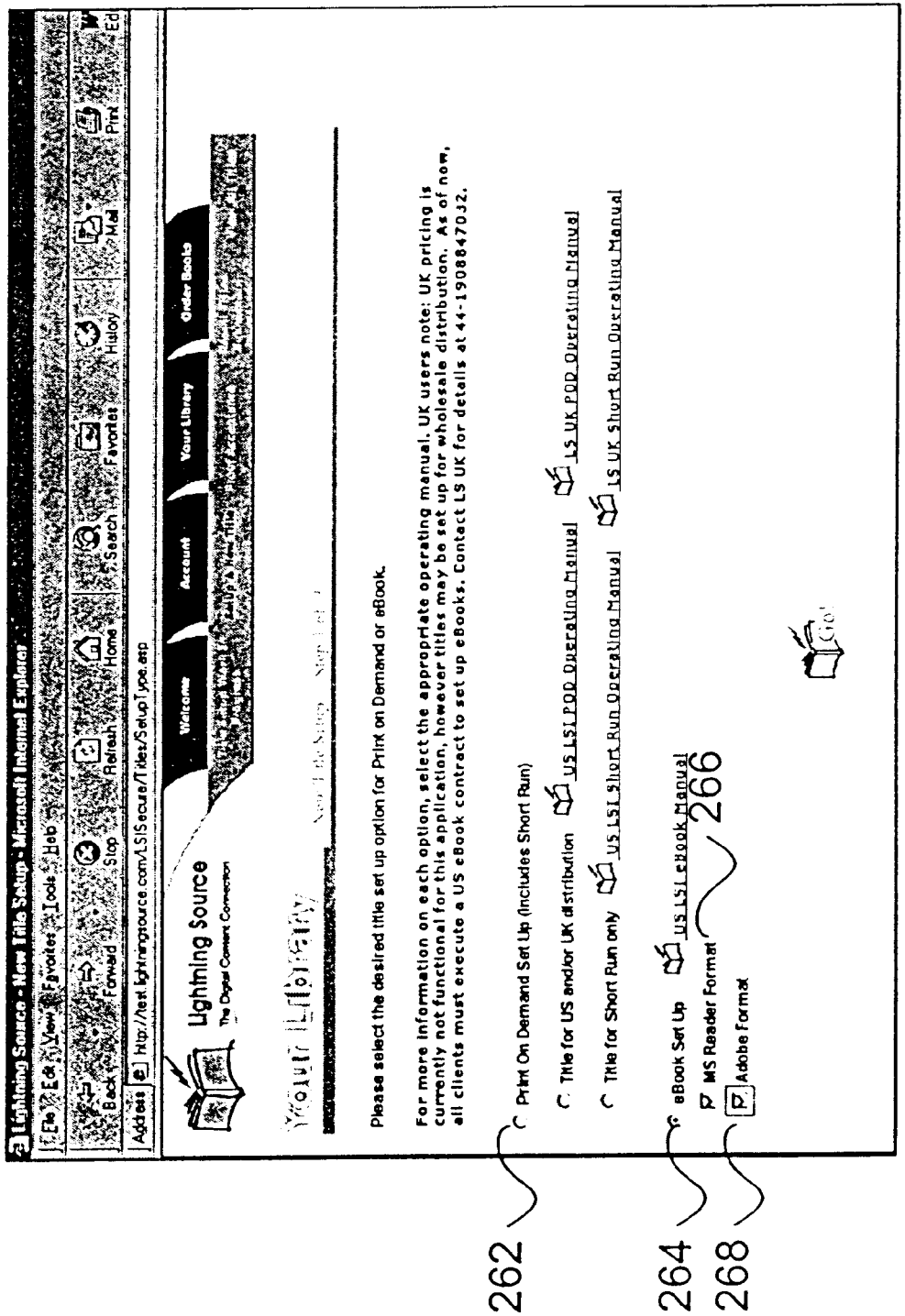

As shown in FIG. 5, after establishment of an account, content submission can permit user selection of hard copy "print-on-demand" preparation 262 and/or eBook distribution 264 of the content. As shown, a publisher selecting eBook distribution 264 may also select one or more DRM schemes for eBook distribution (e.g., "MS Reader Format" 266 or "Adobe eBook Format" 268).

Figure 6:
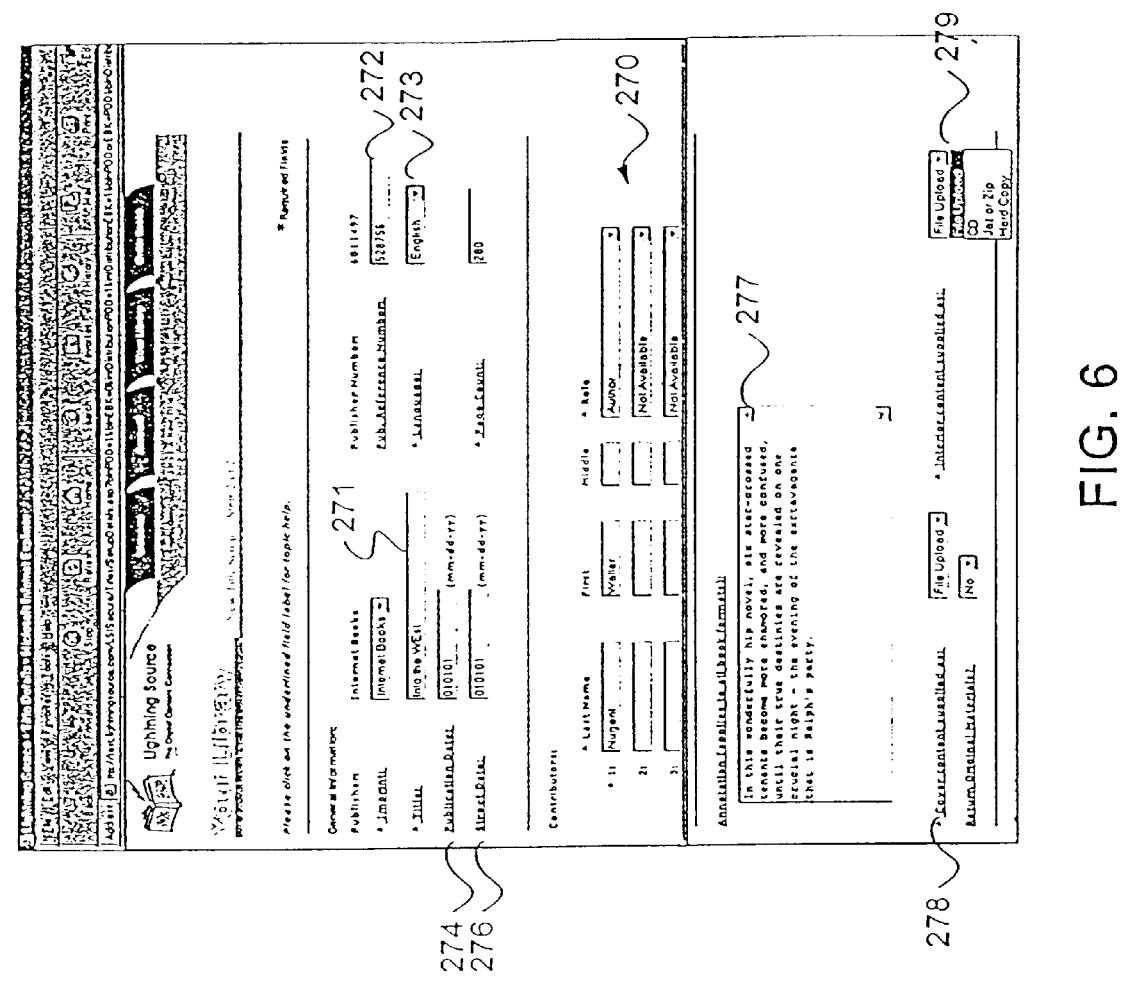

As shown in FIG. 6, a user interface screen may collect some metadata applicable to both eBooks and "print-on-demand" titles. For example, as shown, the user interface can collect a title 271, a publisher reference number 272 such as an ISBN (International Standard Book Number), a language 273, a list of contributors 270, and a summary annotation 277. The user interface may also collect a publication date 274 and/or a "street date" (the date the publication may first be offered for sale) 276 that represents a date in the future before which the publisher does not want distribution to occur.

As shown, the user interface also enables a publisher to select a method of delivering content 278 to the server. For example, a publisher can select file upload over the Internet, physical delivery of a computer readable medium (e.g., a CD-ROM or floppy), or a hard copy for scanning or other conversion into electronic form. The publisher can similarly specify 279 a mechanism for uploading a book cover image.

Other screens may collect other information from a publisher. For example, other screens may collect an edition number or description, an indication of whether the edition is an abridged edition, whether the content is "large print", a series ID and/or number, one or more subject matter categories, an audience age range or reading level, and one or more identification codes (e.g., a Library of Congress card number, a Dewey Decimal Classification No., a UPC [Universal Product Code] code, and so forth).

As shown in FIG. 7, a publisher can also specify both list prices and wholesale discounts. The server can use this information to automatically initiate transactions to compensate the publisher for each sale. The publisher may also specify territorial rights. For example, a publisher may not wish, or be permitted, to sell or transmit content beyond particular geographic bounds.

Figure 8:
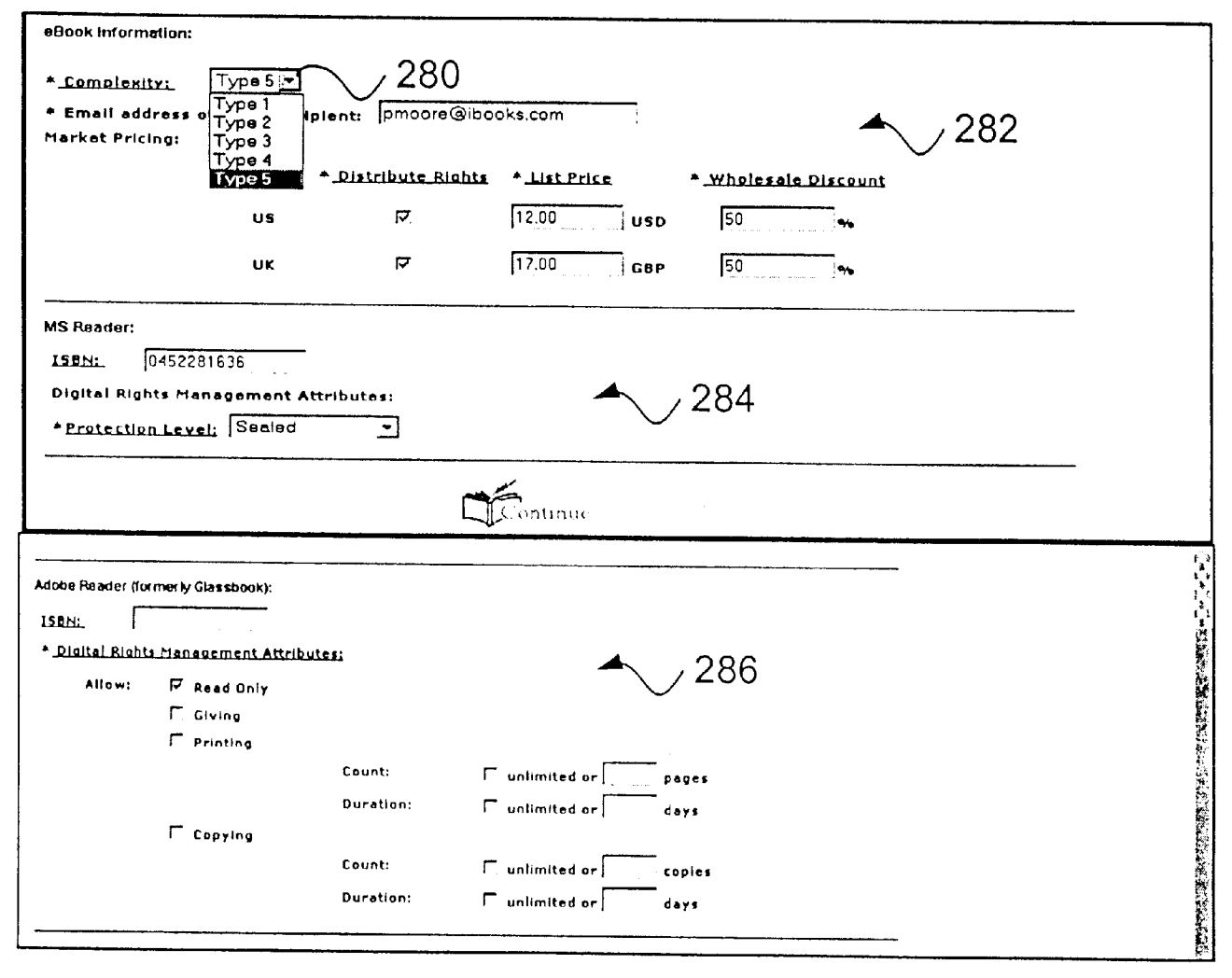

The information collected from a publisher may differ depending on the distribution methods selected. For example, FIG. 8 shows additional information collected for eBook distribution. As shown, the user interface can enable a publisher to select different DRM options 284, 286 supported by selected DRM systems. For example, Adobe Reader options 286 can give a publisher control over consumer printing and copying based on a maximum number of days or copies.

The user interface shown in FIG. 8 also enables a publisher to rate 280 the complexity of the content. For instance, a novel with plain text may be less complex to convert to an eBook than a multi-column, graphic-intensive textbook. The rating scheme may be based on a number of criteria such as the number of columns of text, number of images or tables per page, number of hyperlinks per page, whether the content includes a table of contents, footnotes, and so forth. For example, a rating scheme may be defined as follows:

|        | Description | Example |
|--------|-------------|---------|
| Type 1 | Single column text<br>Limited line art, line charts, tables, and B&W images (no more than 1 per 15 pages)<br>Table of Contents hyperlinking | Novels |
| Type 2 | Single column text<br>Column based images, line art, line charts and tables (no more than 1 per 4 pages)<br>Content hyperlinking (up to 1 per page) | Novels |
| Type 3 | Single column text<br>Column based images, line art, line charts and tables (no more than .6 per page)<br>Intensive content hyperlinking (up to 3 links per page)<br>Extensive and complex tables<br>Indexes, bibliography, or footnotes | Technical, academic, and reference books |
| Type 4 | Multicolumn text<br>Heavy, repetitive formatting<br>Heavy images, large image orientation<br>Limited hyperlinking (less than 1 per page)<br>Images, text or tables across spreads | Cooking, arts & crafts, coffee table books |
| Type 5 | Flowing layouts with minimal repetitive formatting<br>Highly illustrative<br>Intensive content hyperlinking<br>Media enhancement | Instructional children and young adult books |

Based on the rating, the server may determine a fee for processing the content. Additionally, the server can use the rating to determine whether a requested format may be a poor selection. For example, Adobe PDF format provides a fixed page layout regardless of display device and may not be appropriate for material having many columns.

As shown in FIG. 9, information collected for content selected for "print-on-demand" may differ from that collected for eBook distribution. For example, as shown, the user interface may collect user input specifying a type of binding 288 and/or the text 290 to print on the book spine.

Figure 10:
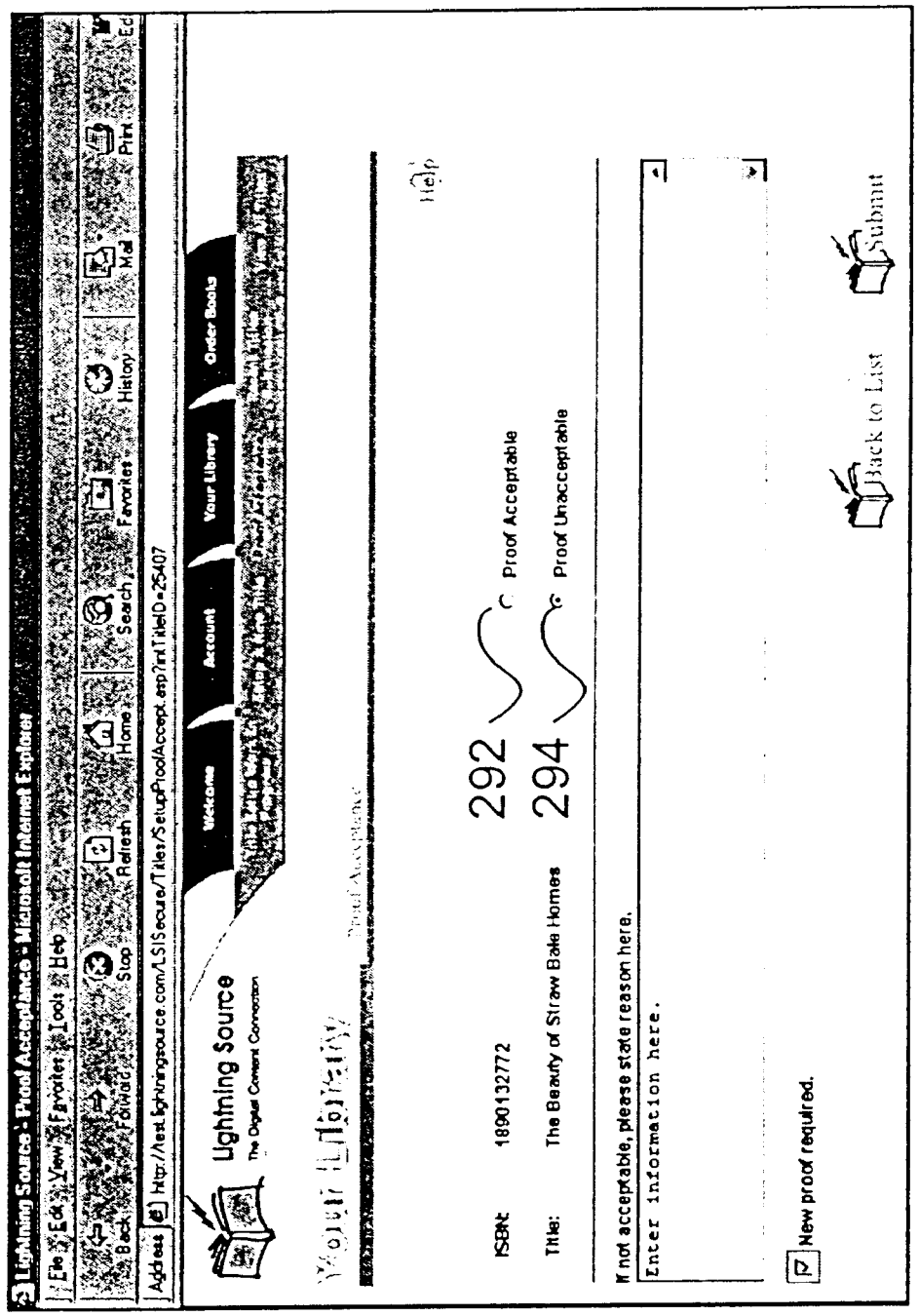

Again, after receiving the metadata entered by the publisher and the content, the server can automatically prepare the content for distribution in the publisher selected format(s). After doing so, the server may generate one or more "proofing" copies of the distribution version(s) of the content. For example, the server may prepare and transmit an eBook to the publisher or, in the case of "print-on-demand" content, the server may prepare an Adobe PDF (Portable Document Format) file featuring images of the pages as they would be printed. In either case, as shown in FIG. 10, a publisher can accept 292 or reject 294 the proofing copy by interaction with the user interface. Accepted proofs will be made available for distribution.

Figure 11:
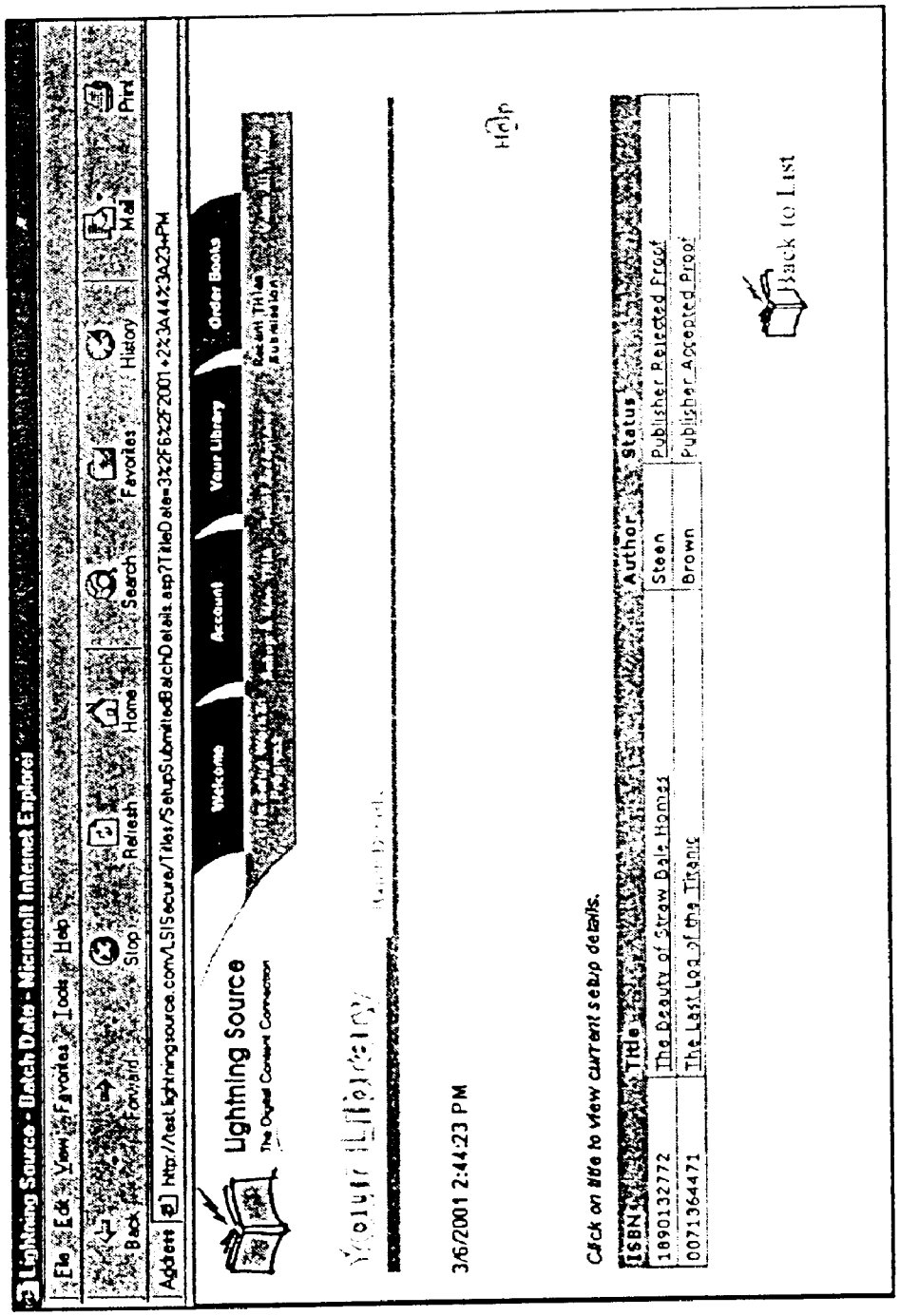

As shown in FIG. 11, a publisher can monitor progress of their submitted titles throughout the content submission process. For example, the user interface shown indicates the status of each submitted title. Such statuses include "awaiting material", "pre-flighting", and "proofing". Additionally, selecting a title hyperlink can cause display of more detailed information about the title, such as its corresponding metadata.

Figure 12:
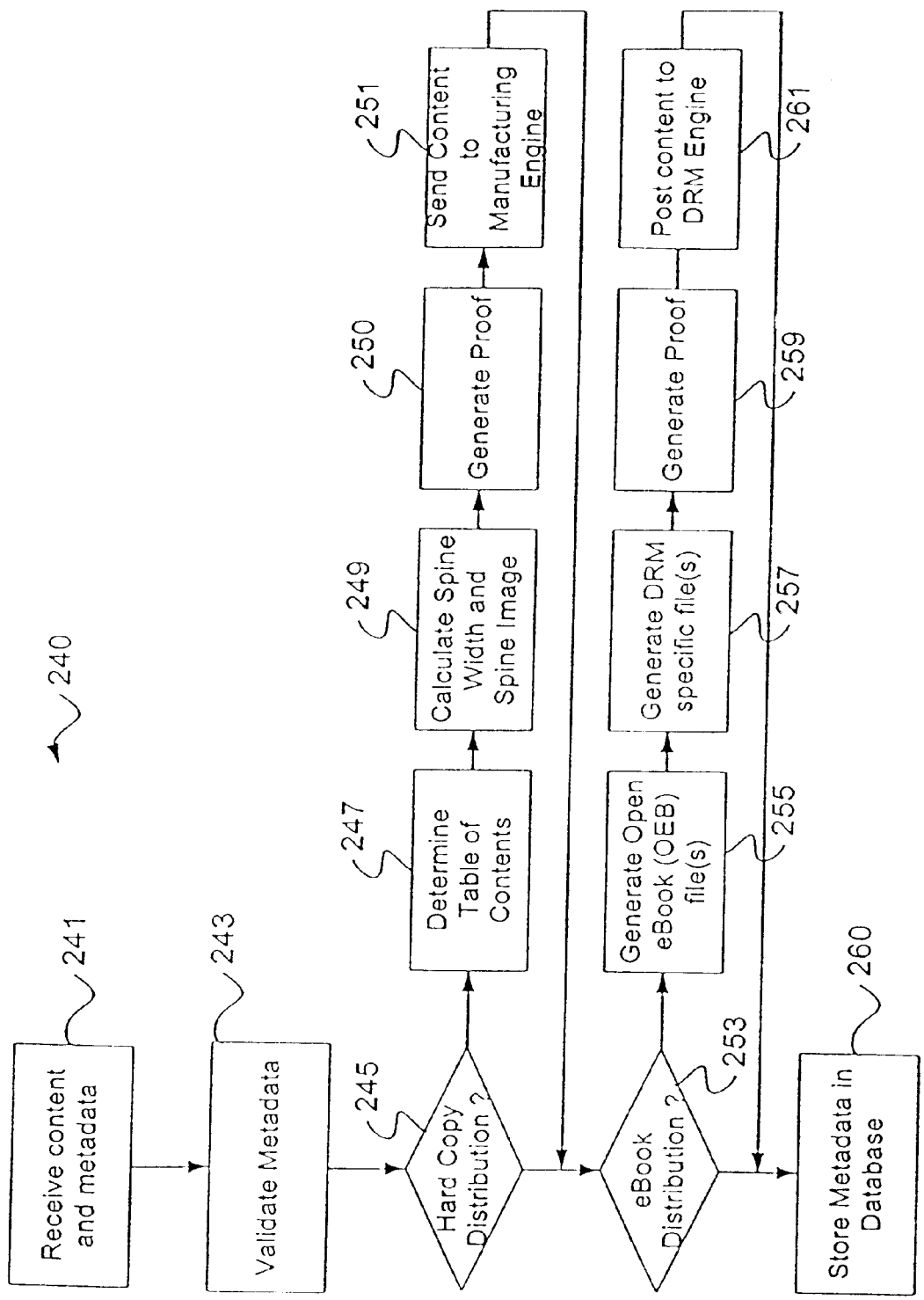
FIG. 12 is a flow-chart of a process for automatically processing received content.

FIG. 12 shows a process 240 for automatic handling of content submission. As shown, the process 240 may begin with receipt 241 of content and its corresponding metadata. The process 240 can handle a wide variety of content formats such as Adobe Acrobat PDF, PostScript, QuarkXpress, PageMaker, InDesign, Word, and tagged text formats such as HTML. Many of these content formats do not include conditional statements.

As shown, the process 240 may validate 243 received metadata. For example, the process 240 may ensure that no metadata specifies a wholesale discount over %50. The process 240 may also validate an ISBN number, for example, by verifying the number's check digit. A wide number of other metadata validations may take place such as a request of payment authorization from a publisher's credit source.

After receipt 241 of the content and metadata, the process 240 automatically checks ("pre-flights") the content for numerous issues which might prevent accurate automatic preparation of a title. For example, the process 240 may verify receipt of all image files and required fonts. Should an error be encountered, the server can automatically notify the publisher and await resubmission.

Assuming the metadata validation 243 and pre-flighting proceeded without significant error, the process 240 can continue converting the received content to a selected distribution format(s), for example, by reflowing and repaginating text, replacing images, and so forth.

If the selected distribution format(s) include hard copy distribution 245, the process 240 can automatically perform a number of tasks that prepare the content for printing. For example, for text submissions, the process 240 can parse the content to construct 247 a table of contents. The process 240 can also perform a wide variety of other tasks such as analyzing the structure of text to indent the first paragraph of a new chapter more than other paragraphs. Similarly, the process 240 may alter text, for example, by compressing three consecutive periods into a single ellipses character or using an elongated dash instead of using a simple "-" character. The process 240 may also perform other tasks, such as extracting a cover image from the content.

As shown, the process 240 can calculate 249 a spine width for a manufactured book based on page thickness and the number of pages. The process 240 can also determine a spine image for the binding, for example, by creating an image of the title in a font that fits the spine width.

After automatically generating information for printing the content, the process 240 can generate 250 a proof copy, for example, by e-mailing images of the pages to be printed or by sending a hard copy of the title for publisher review. After review, the process 240 can send 251 the generated information for the title to a manufacturing engine that can control printing of the title on demand, for example, by printing a color cover, printing a book block, and binding the printed cover and book block.

A different sequence may occur if the selected distribution format(s) include electronic book distribution 253. For example, the process 240 may process the content to generate 255 one or more Open eBook (OEB) files. For instance, the process 240 may include extraction of a cover page from submitted content and/or lossy compression of submitted images to reduce the size of any distribution files.

Based on these OEB files, the process 240 may generate 257 DRM specific files. Generation of DRM specific files may include DRM specific conversions. For example, for an Adobe eBook, generation may include construction of an Adobe style hyperlinked table of contents, a copyright page updated to include eBook ISBN, and logical page numbers that permit eBook pages to match a title page numbering sequence. For a Microsoft eBook, generation may include construction of a Microsoft style floating hyperlinked table of contents, a copyright page updated to include eBook ISBN, and conversion of non-supported book layouts (e.g., marginal notes, floating art, cross spread images or boxes, conversion of footnotes to endnotes, placement of footnote as display text, and placement of images or graphics close to, but not preceding, the callout). Additional advanced features may also be available at the option of the publisher. These can include linked index entries, removal of blank pages, cross-referencing, contextual links, listings of figures and tables, and links from text reference of a figure to the figure or a footnote text reference to an endnote. After proofing 259, the completed DRM specific file is posted 261 to a DRM Engine (described below) for subsequent distribution.

As shown, after generation of a title in the selected distribution format(s), the process 240 may store 260 the title's metadata in a database of metadata corresponding to different titles. As described below, this stored metadata can be used to construct a catalog of titles for a retailer.

III. Catalogs

Retailers often play an important role in publication sales, for example, by handling the tasks of promoting publications. For instance, Amazon.com promotes most of its available publications with a web-page providing a cover image, summary, and reader reviews. Some retailers provide libraries of over one million titles making the maintenance of their offerings a potentially time consuming task.

Figure 13:
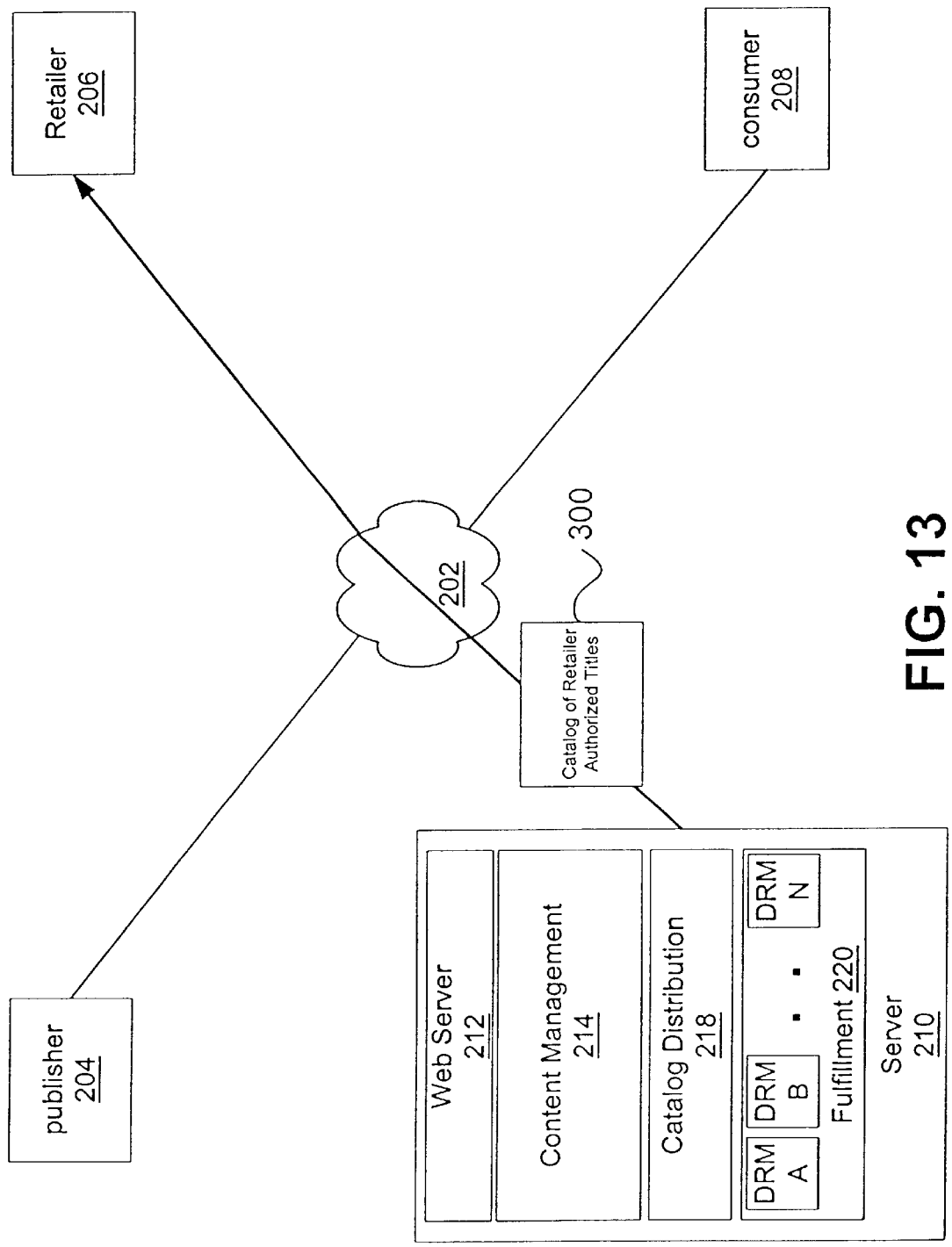
FIG. 13 is a diagram illustrating catalog distribution to a retailer.

As shown in FIG. 13, a server 210 can include catalog generation and distribution instructions 218 that can generate a "catalog" 300 of titles a retailer is authorized to sell. The catalog 300 can list titles available to a retailer and can include some or all of the metadata submitted with a title. Additionally, the catalog generation instructions 218 can customize the format of the catalog 300 for a particular retailer 206, for example, to work with software the retailer may use to manage title information. For instance, the retailer 206 may feature software that automatically processes a received catalog 300 to create new web-page information for new titles or amend web-page information for pre-existing ones.

Figure 14:
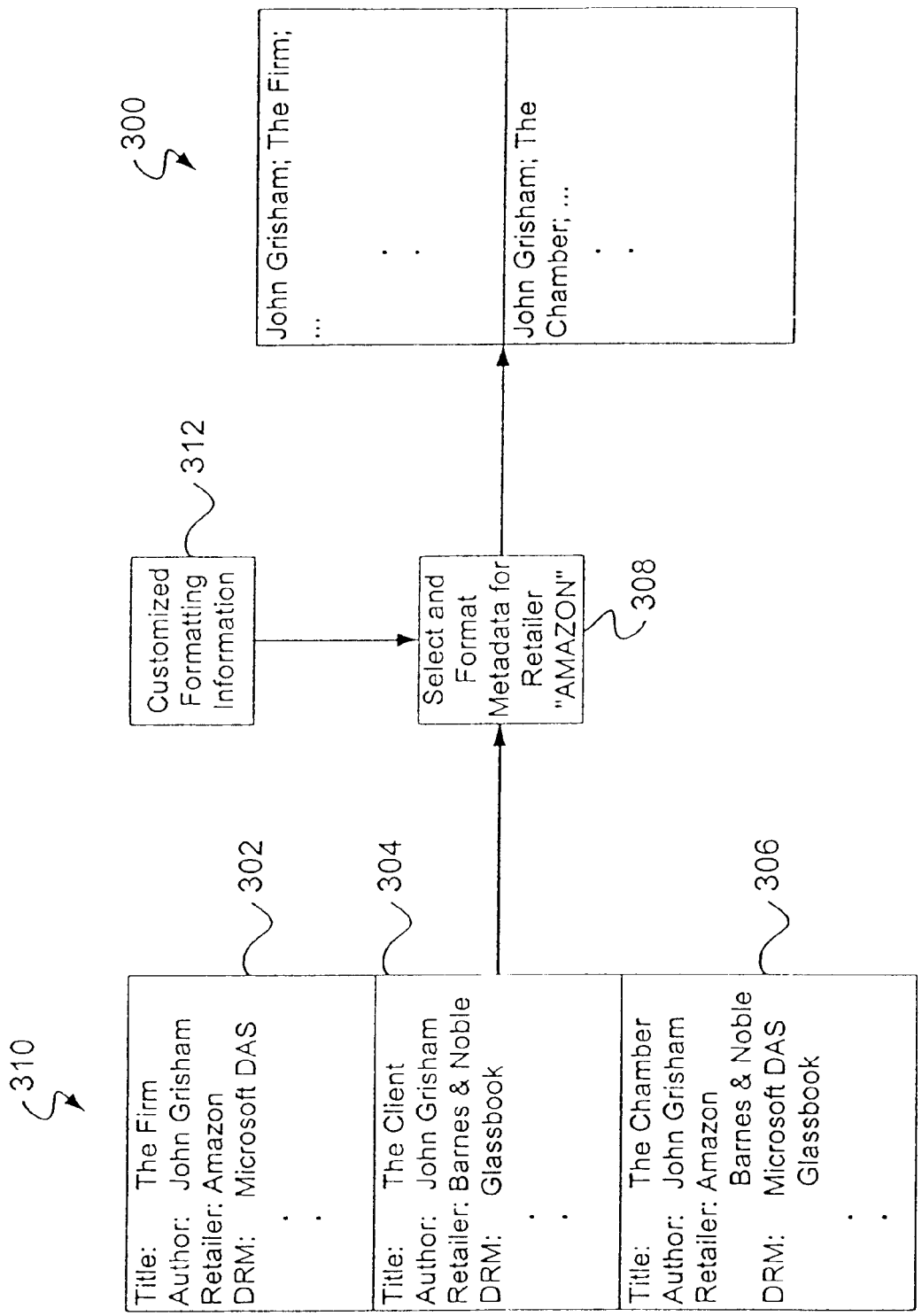
FIG. 14 is a diagram illustrating catalog generation.

FIG. 14 illustrates an example of catalog 300 generation. As shown, a process 308 selects catalog 300 data from stored metadata records 310. The metadata records 310 correspond to submitted titles and can include information identifying one or more authorized retailers and/or one or more unauthorized retailers. The process 308 can use the information to select metadata records of titles a particular retailer is authorized to handle.

For example, metadata records 302 and 306 designate "Amazon" as an authorized retailer for eBooks of John Grisham's "The Firm" 302 and "The Chamber" 306. Thus, the catalog 300 generated by the process 308 can include records for these titles, for example, as a result of an SQL (Structured Query Language) query for records listing "Amazon" as an authorized retailer.

While the metadata records shown specify individual retailers, a publisher may identify a group of retailers by attributes or a grouping code (e.g., "E-Commerce Vendors"). Additionally, a default set of retailers may apply to metadata records that do not specify a particular set of retailers.

Since different retailers may use different software and/or data formats to process title records, the process 308 can customize the catalog 300 file generated for a particular retailer by using customized formatting information 312. Such formatting information 312 can specify the metadata to include in the catalog 300 and the arrangement and encoding of included metadata. For example, as shown, the catalog 310 features a semi-colon delimited record for each title. That is, a semi-colon separates different fields of the record. Alternatively, catalog 300 records can be encoded in a markup language for easy incorporation into a retailer's web-pages. For example, a record of "<TITLE>The Firm</TITLE><AUTHOR>Grisham</AUTHOR>" includes <TITLE> and <AUTHOR> markup tags that identify the information included in the record.

In addition to text and other data, a retailer may also prefer to receive an image of a book cover for display by their web-pages. Such images may be included as data within a catalog, for example, as JPEG (Joint Picture Experts Group) or GIF (Graphics Interchange Format) image data. Alternatively, each title may have corresponding images stored at a FTP (File Transfer Protocol) site in accordance with a naming convention such as title_xpixelsize_x_ypixelsize.format (e.g., TheFirm_600_x_400.jpeg).

Figure 15:
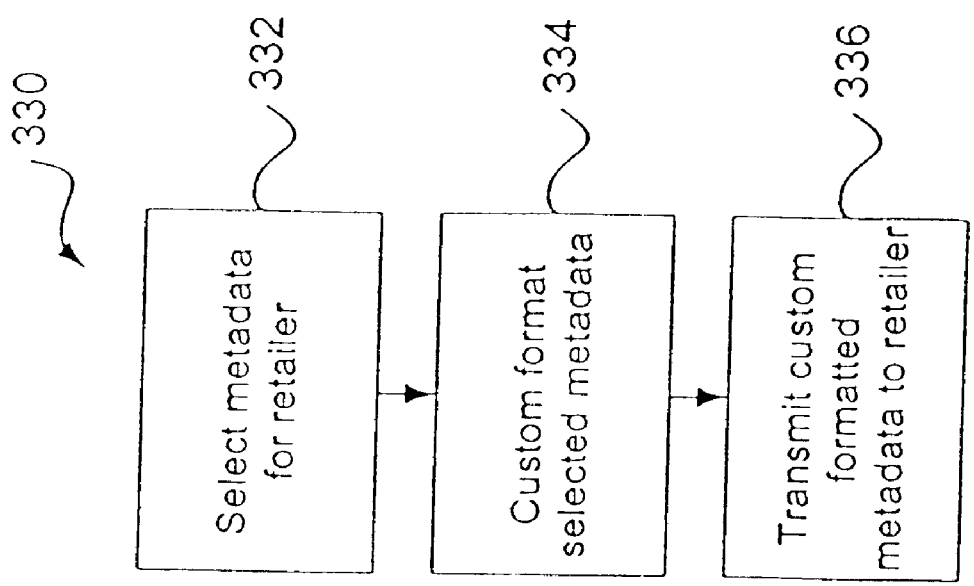
FIG. 15 is a flow-chart of a process for generating a catalog.

FIG. 15 illustrates an example of a process 330 that the catalog generation instructions 218 may implement. As shown, the process 330 selects 302 metadata records of titles for inclusion in a retailer's catalog. The selection 302 can feature both "authorization filters" that restrict retailers to titles they are authorized to sell and "retailer defined filters" that prevent retailers from including in a catalog works they are not interested in selling or promoting.

The authorization filters can test for a variety of conditions that may prevent inclusion of a work in a retailer's catalog. For example, the filters may eliminate a work from a catalog if the retailer is outside the territory in which the work is authorized to be sold. Similarly, the filters may eliminate a title from inclusion in a catalog if the title has not yet been priced for sale or if the work has not yet been proofed by the publisher.

The "retailer defined filters" enable a retailer to specify characteristics of works that the retailer does not want to sell or promote. For instance, "Bob's Sci-Fi eBook Store" may only be interested in publications categorized as science or science fiction. Thus, in this example, the process 330 may check to limit titles included in a Bob's catalog to only include titles in these categories. Similarly, a retailer, for example, may request only those titles approved by some organization.

As described above, information for titles selected for inclusion in the catalog may be formatted 334 according to retailer preference. After completing the selection 332 and formatting 334, the catalog may be transmitted 336 to the retailer. Transmission may occur, for example, via e-mail or a sequence of HTTP messages. Transmission may alternatively occur by storing the catalog in an FTP (File Transfer Protocol) directory accessible by the retailer. This latter option enables the retailer to control when and how often the catalog information is received.

The process 330 shown in FIG. 15 may be programmed to automatically repeat at a designated interval. For example, a retailer may request automatic generation of a catalog on a daily or weekly basis. For retailers receiving more than one catalog at different times, the process 330 may generate "delta" catalog files that only include changes from a preceding catalog. For example, the catalog may only include new titles authorized for sale by a retailer or new/changed information about titles in a previous catalog or catalogs.

IV. Fulfillment

Figure 16:
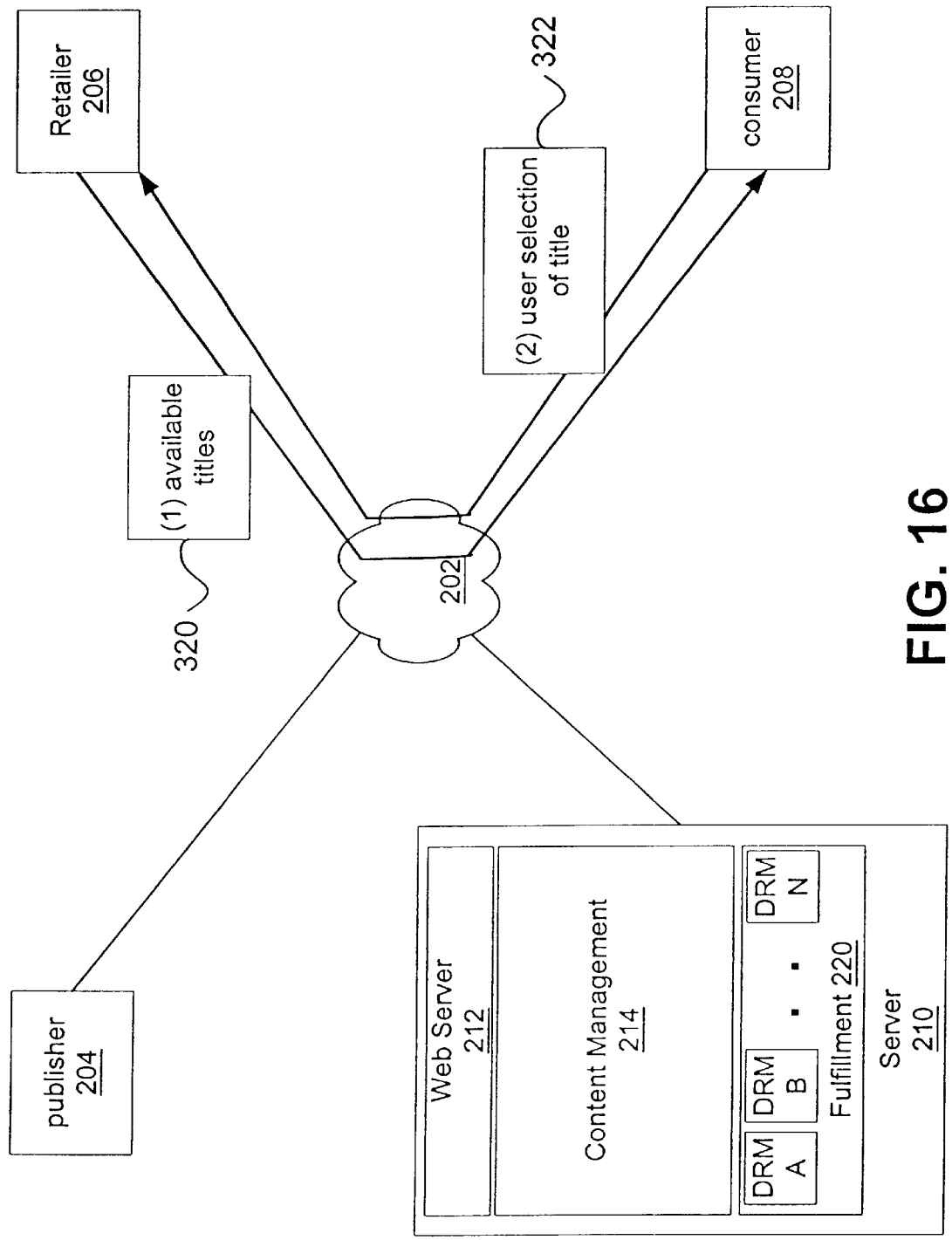
FIGS. 16–18 are diagrams illustrating fulfillment of a request for an electronic book.
Figure 17:
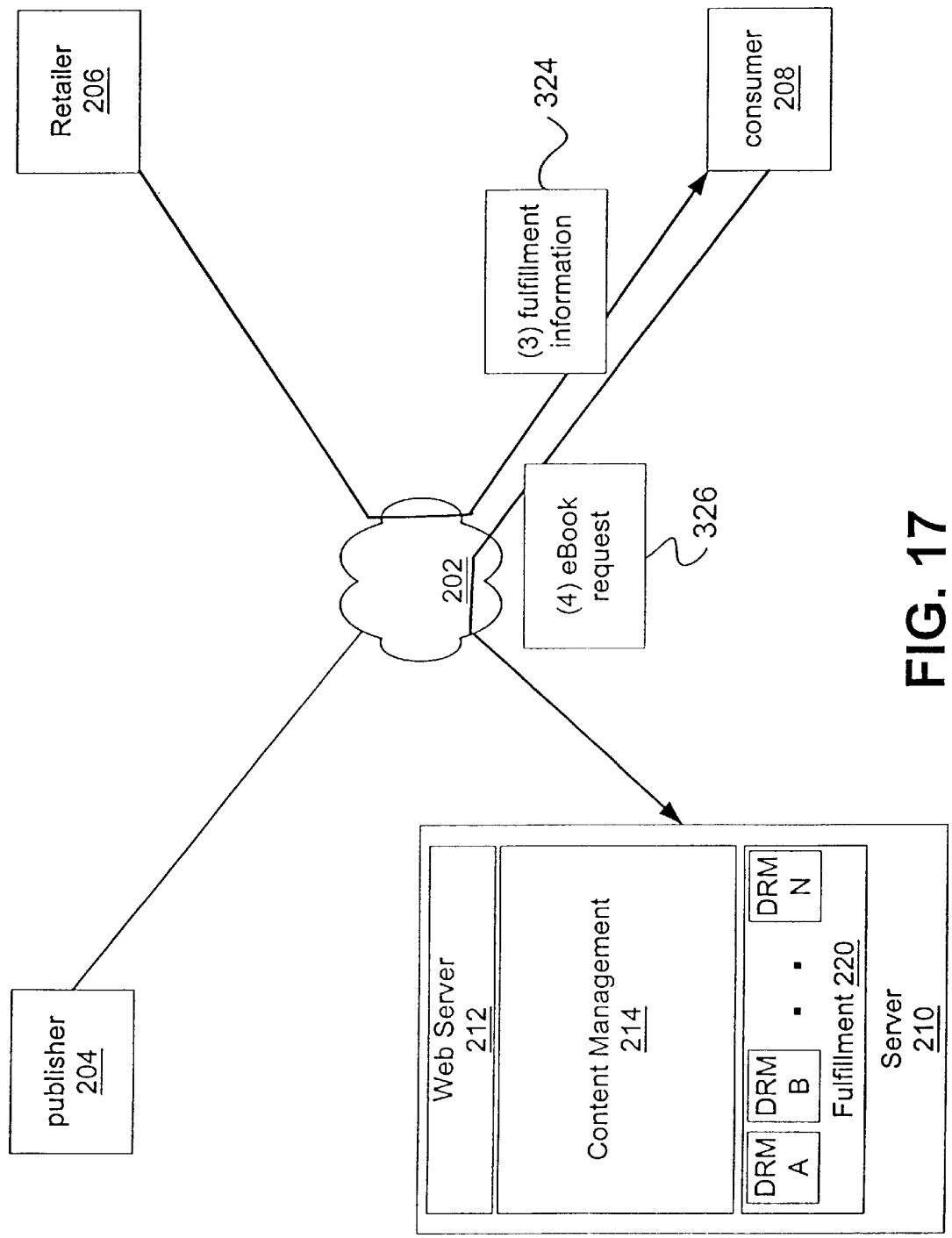
Figure 18:
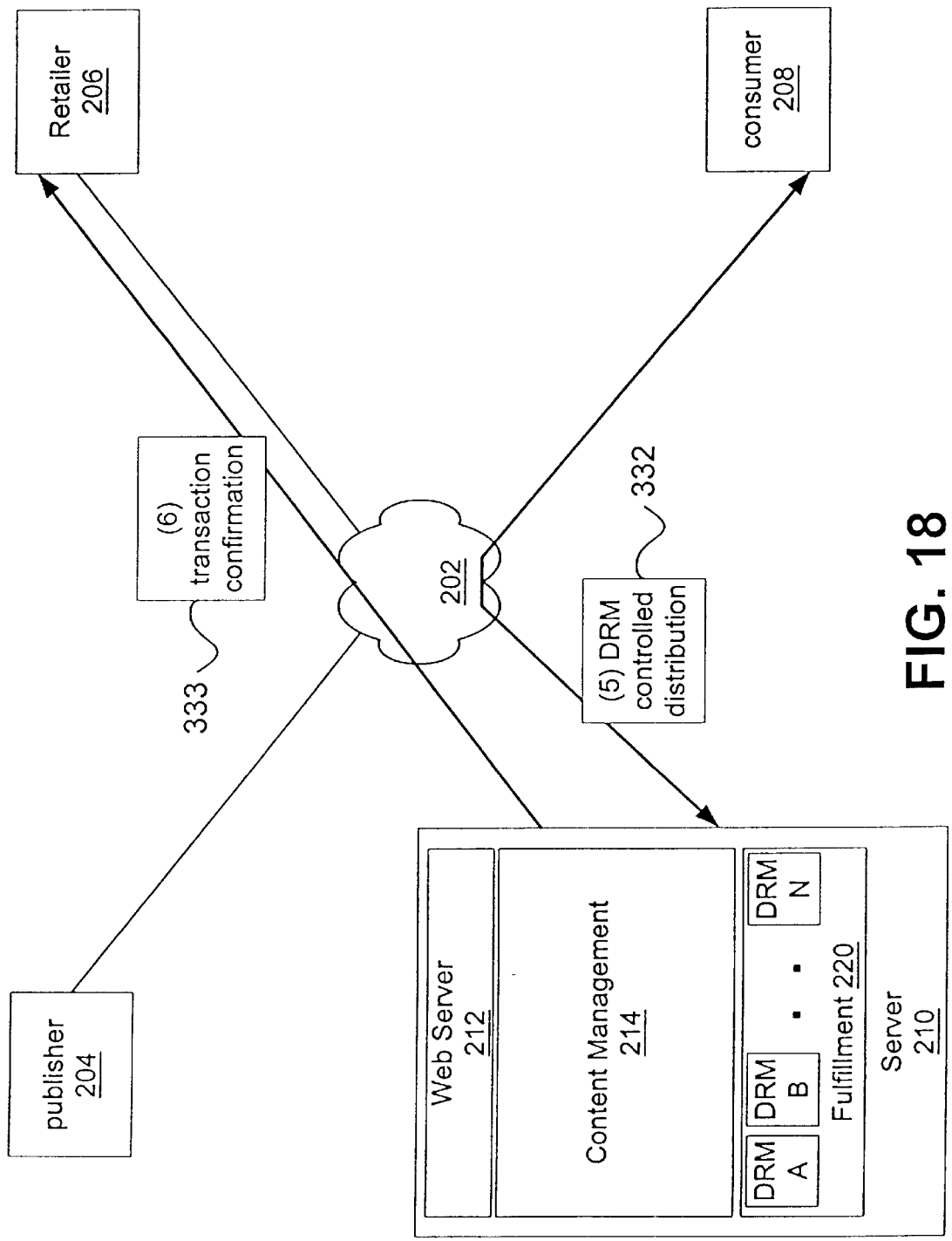

A server 210 may provide a web-site that enables consumers and/or publishers to request electronic books or "print-on-demand" hard copies of a title. However, as described above, retailers often handle the task of presenting titles to consumers for purchase. For example, Amazon.com allows consumers to search lists and descriptions of different available eBooks. In the case of eBooks, fulfilling purchase requests can add the burden of DRM system maintenance and support to a retailers responsibilities. FIGS. 16–18 illustrate a system that can remove the burden of handling these fulfillment duties from a retailer.

As shown in FIG. 16, a consumer 208 can interact with a retailer 206 over a network 202 through mechanisms selected by the retailer 206 such as web-pages, email, and so forth. After a consumer 208 requests 322 an eBook title, for example, by selecting a title from a web-page 320, a fulfillment process 220 provided by a remote server 210 handles distribution of the eBook to the consumer. The server 210 may be the same server 210 providing other features described herein.

As shown in FIG. 17, the retailer 206 transmits fulfillment information 324, such as a URL (Universal Resource Locator) link, to the consumer 208 for each purchased eBook. For example, the retailer 206 may include the URL in an e-mail message sent to the consumer 208 or may include the URL in a dynamically constructed web-page that lists items requested by a consumer 208.

When activated, the link directs a secure message 326 to the server 210. The message 326 encodes identification of the title ordered and identification of the retailer. For example, a consumer may receive a URL having the following format:

https://server.com?parameters=retailerID&itemID where "https" identifies a secure connection between the consumer 208 and server 210, "server.com" identifies the location of the server 210 in the network, and retailerID and item ID identify the retailer and ordered item SKU (Store Keeping Unit, the product identifying number used by the server 210), respectively. The URL parameters may be encrypted, for example, using Triple DES. Additionally, the URL may feature additional parameters such as a time stamp and/or the results of a hashing of the other parameters to thwart pirate attempts to construct a valid URL. The URL may also include a tracking number assigned by the retailer to the transaction for retailer tracking purposes. As the server 210 may insulate the retailer 206 from DRM tasks, the URL need not include identification of any particular DRM system.

As shown in FIG. 17, when the consumer selects the URL link, the consumer's 208 client no longer needs to interact with the retailer 206, but is instead interacting with the server 210. However, this may be completely transparent to a consumer 208. That is, the consumer 208 may only perceive interaction with the retailer 206. To enhance this effect, the server 210 may provide user interfaces customized for a particular retailer. For example, a server 210 may provide status and error message web-pages that prominently feature the retailer's logo, stylesheet, or other information for each retailer using the server 210

As shown in FIG. 18, after receiving the eBook request, the server 210 handles distribution 332 of the eBook to the consumer in accordance with the digital rights management system associated with the title. After distribution 332, the server 212 can transmit confirmation 333 to the Retailer 206 describing both successful delivery of the content or, in the event of a failure, what the reason for failure.

As shown, the server 210 supports multiple DRM systems. While each DRM system may operate differently, many share a similar sequence. In a typical scenario, DRM distribution of a title begins when a DRM system attempts to connect to the consumer's 208 reader software. If the reader software is not installed, the system can guide the consumer through a download/installation process. The DRM system then requests credentials (e.g. computer ID, reader software ID) and uses these credentials to "lock" a copy of the ordered title for that consumer. Such locking may occur by encrypting a copy of the title or providing an encrypted voucher needed by the reader software to open a generically encrypted copy of the title. A "locked" copy of the title is then sent to the consumer 208. The consumer's 208 device then automatically launches the reader software associated with the DRM scheme used and loads and presents the title. While the process described above may seem complex, the entire process happens in real-time and, typically, does not take more time than loading a standard web page.

The scheme described above can offer a number of potential benefits. Again, by server 210 handling fulfillment, retailers need not be aware that DRMs are even being used.

Additionally, while FIGS. 16–18 illustrate distribution of a title for a single retailer 206, the server 210 can support many different retailers and their consumers simultaneously. Thus, addition of a new DRM system at the server 210 can expand the number and variety of product distribution capabilities of many retailers.

The server 210 may implement DRM handling by bundling instructions for different DRM systems into a DRM Processing Engine. The server 210 may include many different DRM Processing Engines operating in parallel. This technique can permit load balancing between the DRM Processing Engines and provide scalability as the number of fulfillment operations increases. Additionally, new DRM Processing Engines can be added or removed at any time without impacting system availability.

Figure 19:
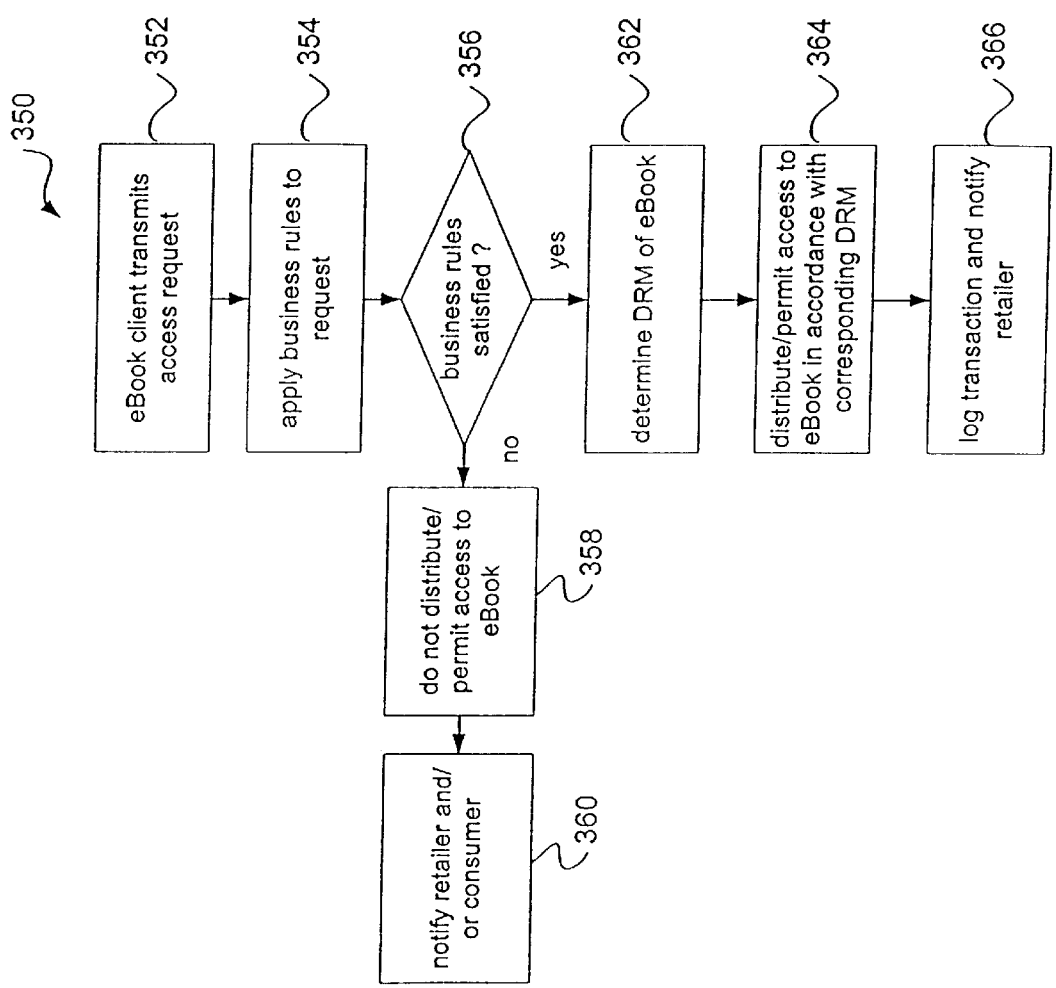
FIG. 19 is a flow-chart of a process for fulfilling a request for an electronic book.

FIG. 19 illustrates a title fulfillment process 350. As shown, the process 350 receives a request for a title 352. The process 350 may then verify security information (e.g., a hash value) received with the request. This may trigger transmission of a confirmation message (e.g., an HTTP message) to the retailer. This provides retailers with virtually real-time confirmation of consumer use of the order link supplied by the retailer 206. These confirmation messages may be queued for retransmission when a retailer's 206 web-site is down. The confirmation message may include identification of the ordered title and/or order number, among other information.

As shown in FIG. 19, the process 350 may determine 354 whether to distribute the electronic book to the network client in accordance with one or more business rules applied 354 independent of DRM operation. For example, a business rule may verify that the retailer identified in the request is authorized to sell the title. A different business rule may deny access to a title before a street date specified by the publisher. Yet another business rule may verify that the consumer is not downloading the book to different devices or exceeding a maximum number of downloads. As new requirements emerge, business rules may be created and/or updated. The business rules may be encoded, for example, as boolean expressions or in a programming language such as C and/or SQL (Structured Query Language). If a business rule indicates distribution should not occur 358, the process 350 can transmit 360 corresponding error messages and/or customized screens to the retailer and/or consumer.

After business rule application, the process 350 may determine 362 a DRM system selected for the title. For example, server instructions may use the received retailer ID and the title ID of the request to perform a table lookup of DRM systems associated with the title by the retailer. Thereafter, the title can be distributed 364 in accordance with the determined DRM. As specified by a DRM or business rule, successful downloading of titles may be noted to prevent the consumer from re-downloading the same eBook using the original URL link. Failed downloads may not be recorded to enable a consumer to attempt to re-download in the event of a bad Internet connection.

As shown, the process 350 may log 366 information describing a transaction, for example, by logging information used in billing, determining publisher compensation, business rule audits, determining DRM usage fees, and so forth.

Again, throughout the process 350 illustrated in FIG. 19, retailers and/or consumers may receive status and error messages regarding the progress of their request. Examples of events that can cause notification include the occurrence of unknown errors, completion of a successful download, a determination that a title was not found or available, a determination that the consumer did not order the title from an authorized retailer, a determination that the download attempt exceeded a limit, the occurrence of communication errors, a determination that reader software was not installed or activated, and a determination that the received consumer credentials were incorrect. While the server may offer a predefined set of status and error message web pages, these messages may be customize in real-time to each retailer's specifications. Alternatively, events can trigger a re-direct to a web-page provided by the retailer's web-server.

Again, the process 350 may provide retailers with status information such as confirmation of an order. For example, a server may transmit a confirmation message to a retailer that encrypts the order tracking number, time stamp, and other information.

V. Implementations

The techniques described herein are not limited to any particular hardware or software configuration; they may find applicability in any computing or processing environment. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices.

Each program is preferably implemented in high level procedural or object oriented programming language to communicate with a computer system. However, the programs can be implemented in assembly or machine language, if desired. In any case the language may be compiled or interpreted language.

Each such computer program is preferably stored on a storage medium or device (e.g., CD-ROM, hard disk, or magnetic disk) that is readable by a general or special purpose programmable computer for configuring and operating the computer when the storage medium or device is read by the computer to perform the procedures described herein. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A method of distributing electronic books over a computer network, the method comprising:

transmitting user interface instructions to a publisher's network client in response to an HTTP request received from the client, the user interface instructions providing a web-page form to enables the publisher to identify electronic content and corresponding metadata, the metadata including designation of at least one electronic book digital rights management system from at least two supported digital rights management schemes from different unaffiliated vendors, the metadata also including hard printing information;

receiving the identified electronic content and metadata from the network client;

automatically generating an electronic book from the received electronic content corresponding to the identified electronic book digital rights management system;

storing the metadata with metadata associated with other received electronic content;

selecting metadata from the stored metadata, the selected metadata corresponding to electronic content authorized for a retailer;

storing at least a portion of the selected metadata for transmission to a retailer over the network in accordance with formatting information received from the retailer;

receiving a request for the electronic book from a network client in response to a user's selection of the corresponding electronic content from a user interface provided by the retailer, the request including an electronic book identifier and a retailer identifier, the request being a URL that encodes the electronic book identifier and the retailer identifier as one or more URL parameters;

determining whether to distribute the electronic book to the network client by applying one or more business rules to the request; and distributing the electronic book to the network client in accordance with the electronic book's electronic book digital rights management system.

* * * * *